UNITED STATES PATENT OFFICE.

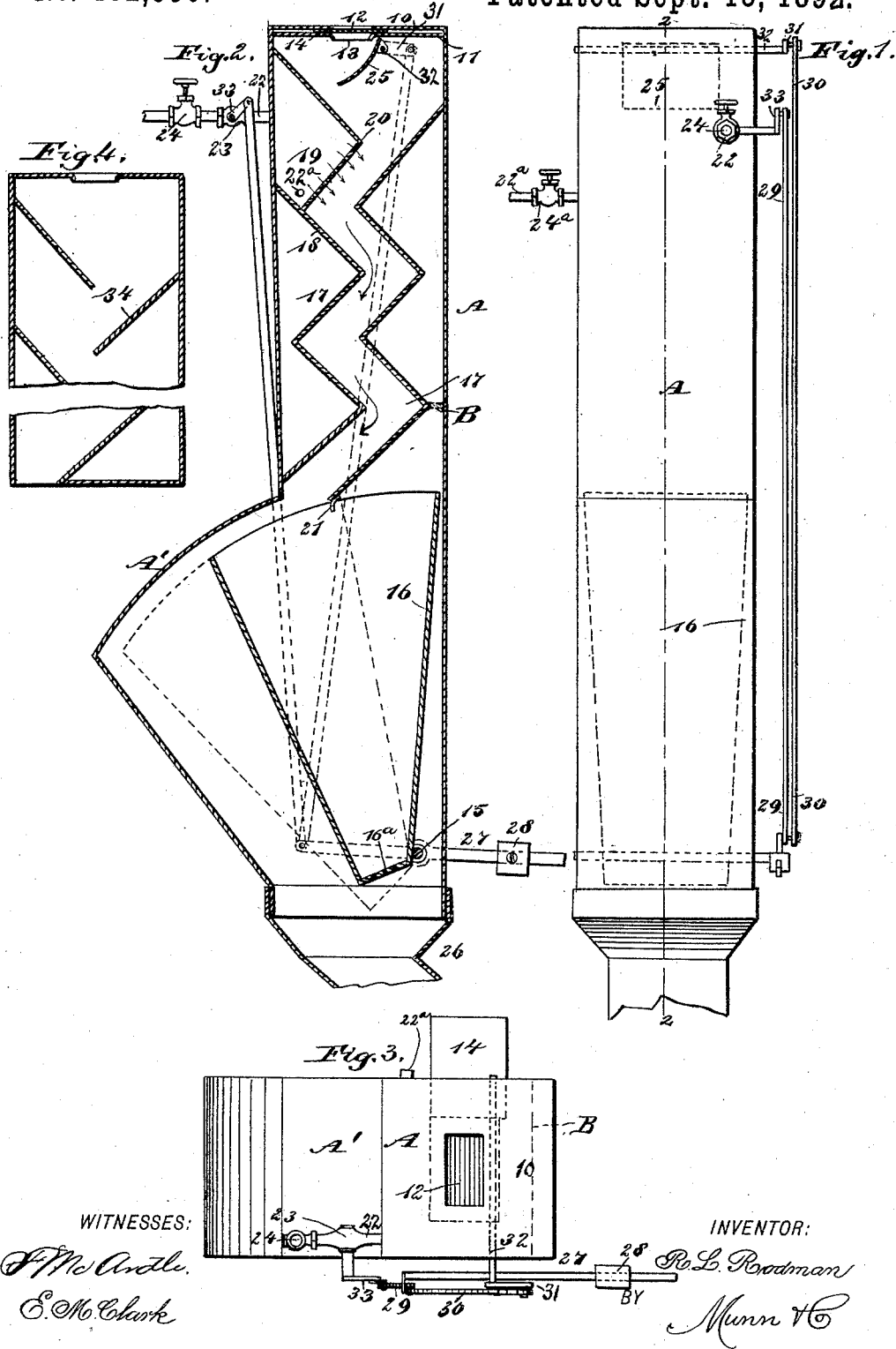

ROLLIN L. RODMAN, OF KINGMAN, KANSAS.

DEVICE FOR STEAMING OR TEMPERING GRAIN.

SPECIFICATION forming part of Letters Patent No. 482,590, dated September 13, 1892.

Application filed February 2, 1892. Serial No. 420,074. (No model.)

*To all whom it may concern:*

Be it known that I, ROLLIN L. RODMAN, of Kingman, in the county of Kingman and State of Kansas, have invented a new and Improved Device for Steaming or Tempering Grain, of which the following is a full, clear, and exact description.

My invention relates to a device for steaming or tempering grain, and has for its object to so construct the device that if the supply of grain to the grinding machine or bin should be stopped the device will automatically operate to cut off both the supply of material and the supply of steam, and whereby, also, when it is necessary for the supply to the grinding machine or bin to be continued the device will automatically act to admit grain to it and steam also.

Another object of the invention is to provide a device or apparatus of exceedingly simple, durable, and economic construction.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of the device or apparatus. Fig. 2 is a vertical section taken through the same practically on the line 2 2 of Fig. 1. Fig. 3 is a plan view; and Fig. 4 is a section of the body of the apparatus or device, illustrating a slight modification in the construction of the grain chute or passage-way.

The body A of the apparatus is shaped as a casing, being closed at its sides, open at its lower end, and practically closed at its top. The casing is preferably made rectangular in cross-section for the greater portion of its length; but upon one side an extension A' is made, extending, preferably, from a point at or near its center practically to the bottom. The front of this extension is ordinarily inclined and the top may be convexed, as is best shown in Fig. 2.

The top of the casing consists of two parallel and spaced plates 10 and 11, the upper plate being provided with an opening 12 and the lower plate with a corresponding opening 13, the latter opening being preferably surrounded by a downwardly-extending collar. The grain is admitted to the casing through these openings, and the quantity of grain to be admitted is regulated through the medium of a slide 14, located between the plates 10 and 11 and adapted to be passed across and between the inlet-openings 12 and 13.

At one side of the casing, near the bottom and within it, a shaft 15 is journaled. This shaft is rigidly secured to the lower back portion of a hopper 16. This hopper is preferably provided with a convexed top and is somewhat triangular in vertical section, as illustrated in Fig. 2, and the hopper and shaft are so located that the former is capable of dropping down within the extension A' of the casing when such movement is necessary.

Within the casing above the hopper a zigzag passage-way 17 is formed. This zigzag passage-way or "chute," as it may be termed, is formed by locating within the casing zigzag partitions, which extend from one side of the passage-way to the other. The upper portion of the zigzag passage-way includes the upper portion of the casing, or that portion below the inlet-apertures, and one of the partitions 18 is carried to what may be termed the "front wall" of the casing to form a steam-chamber 19, as is best shown in Fig. 2, and in the bottom of this steam-chamber a series of apertures 20 is produced, through which the steam passes from the chamber into the passage-way or chute 17. The outlet or lower end of the passage-way or chute, which is open, is located immediately above the hopper 16 and has attached thereto a stop 21, which prevents the hopper when it falls within the extension A' from dropping too low.

A steam-pipe 22 connects with the steam-chamber 19, and this pipe is provided with a valve 23 near the casing, which may be of any approved construction and is capable of admitting steam to the steam-chamber or of shutting steam off therefrom. A second valve 24 is also connected with the steam-pipe 22 between the steam-supply and the valve 23, the valve 24 being adapted as a regulating-valve, since it is intended for use to regulate the amount of steam to be supplied to the valve 23, and consequently the amount of steam entering the chamber 19.

Beneath the inner inlet-opening 13 in the top of the casing a valve or cut-off 25 is located, being pivoted at or near one end within the casing. This valve or cut-off is placed a short distance below the inlet-opening and far enough from it to prevent a grain of wheat or oats or whatever grain is to be manipulated and supplied to the device from stopping between the valve and the top of the casing, so that it will not interfere with the action of the cut-off. The cut-off or valve 25 is of greater surface area than the area of the inlet-opening, and this construction is made in order that the valve or cut-off 25 need not necessarily shut up close against the sides of the inlet-opening or make a close fit against the top of the casing. This valve or cut-off may be either flat or slightly cup-shaped, as shown in Fig. 2. The lower end of the hopper 16 is either entirely open or is provided with an opening 16$^a$ therein, and the lower end of the casing is fitted in a spout 26, the said spout being adapted to convey the treated grain to the grinding machine or bin or wherever it may be desired to deposit the grain. A lever 27 is attached at or near its center to one outer end of the shaft 15, and upon the rear end of this lever a weight 28 is adjustably secured, the weight being adapted to slightly more than balance the weight of the hopper 16 and maintain the latter under normal conditions in an upright position. The forward end of the lever 27 has pivotally connected therewith two connecting rods or links 29 and 30. These rods or links extend vertically upward, and one of them—the rod or link 30, for instance—is connected by a link 31 or otherwise with the shaft or trunnion 32, upon which the cut-off or valve 25 is attached and through the medium of which it is manipulated. The other rod 29 is connected by a link 33 or the equivalent thereof with the key of the valve 23, as is shown in Figs. 1 and 2. Thus in the event that the weight in the hopper should overcome the weight attached to the lever 27 the forward end of the lever will be lowered, and the connecting-rods 29 and 30 will independently and automatically act to shut off the supply of steam by closing the valve 23, and also the supply of grain to the casing by closing the valve or cut-off 25.

In Fig. 4 I have illustrated a slightly-modified form of the chute or passage-way 17, in which the chute or passage-way is also zigzag, but is produced by inclining downward from opposite sides of the casing-partitions 34, located one below the other; but in practice the form of passage-way or chute shown in Fig. 2 is preferred.

In operation the grain enters the passage-way or chute through the inlet-openings 12 and 13 in the casing and flows down the said chute or passage-way, as indicated by arrows in Fig. 2, creating at the time a slight suction and dropping from one incline to the other. In this manner of progress the grain is more or less scattered, and the steam, entering the zigzag passage-way or chute through the apertures in the steam-chamber and being lighter than the grain, will follow the bends in the passage-way or chute, and will therefore pass through the scattered grain as it drops from one bend or incline to another, and will thus steam equally each grain. In the event that the apparatus is set to steam more grain than the grinding-machine can take away, or the bin containing it or to which it is to be delivered should become full, the grain will back up in the hopper 16 until the weight in the hopper overcomes that of the balance-weight 28. At this time the hopper will tip forward, as shown in dotted lines, Fig. 1, revolving the shaft to which it is attached and depressing the forward end of the lever 27, whereupon the rods 29 and 30 will be brought immediately into action to shut off the supply of steam and close the cut-off or valve at the inlet, thus preventing the ingress of grain into the casing. The moment that provision is made for taking away the grain from the lower delivery-chute 26, and as the grain in the casing leaves the hopper, the weight 28, being heavier than the hopper, will force the rear end of the lever 27 downward and restore the hopper to its normal or vertical position.

The zigzag passage-way or chute may be made as long as desired and is provided with as many turns or bends as may be found practically useful, and steam may be admitted into more than one portion of the passage-way if it is found desirable, and by placing a partition horizontally within the casing from the back to the zigzag partition, as indicated at B in Fig. 2, steam may be made to surround the zigzag passage-way or chute and keep the same in a heated state, permitting the apparatus to be used both to steam and to heat the grain.

A drain-pipe 22$^a$, controlled by a valve 24$^a$, leads outwardly from the lower portion of the steam-chamber 19, by means of which pipe the condensed steam in the chamber may be discharged.

It is evident that this device is exceedingly simple and durable in construction and that it is capable of automatically operating to shut off the supply of steam and of grain when occasion may so demand, and when such conditions are removed it will automatically turn on the steam and continue the flow of grain.

Having thus described my invention, I claim as new and desire to secure by Letters Patent—

1. In an apparatus for steaming or tempering grain, the combination, with a counterbalanced hopper having an opening in its bottom and a passage-way or chute provided with steam-inlets located above the hopper, of a valve located beneath the grain-supply opening of the apparatus, a valved steam-supply pipe, and a connection, substantially as shown and described, between the valve of the steam-supply pipe and the valve at the grain-supply opening, substantially as shown and described, whereby the movement of the hopper in one direction will close the valve of the steam-supply pipe and the valve of the grain-supply and when moved in an opposite direction will open said valves, as set forth.

2. In an apparatus for steaming or tempering grain, the combination, with a casing and a hopper pivoted within said casing and having an attached counterbalanced lever, of a zigzag passage-way or chute provided with steam-inlets located above the hopper, a valve located beneath the grain-inlet of the casing, a steam-pipe leading into the casing and supplying steam to the passage-way, said pipe being provided with a valve, and connecting-rods uniting the counterbalanced lever with the said valves, substantially as shown and described, whereby when the lever is moved in one direction the valves will be closed and when moved in an opposite direction the valves will be opened, as set forth.

3. In an apparatus for steaming or tempering grain, a steam-inlet valve, a valve capable of cutting off the supply of grain, a hopper adapted to receive and deliver grain, and a connection between the hopper and the valves, whereby the latter are automatically operated by the former, as and for the purpose set forth.

ROLLIN L. RODMAN.

Witnesses:
  W. A. EATON,
  W. M. WALLACE.